April 20, 1926.
C. E. STARR
1,581,695
TRANSMISSION GEARING
Filed March 1, 1923      5 Sheets-Sheet 3
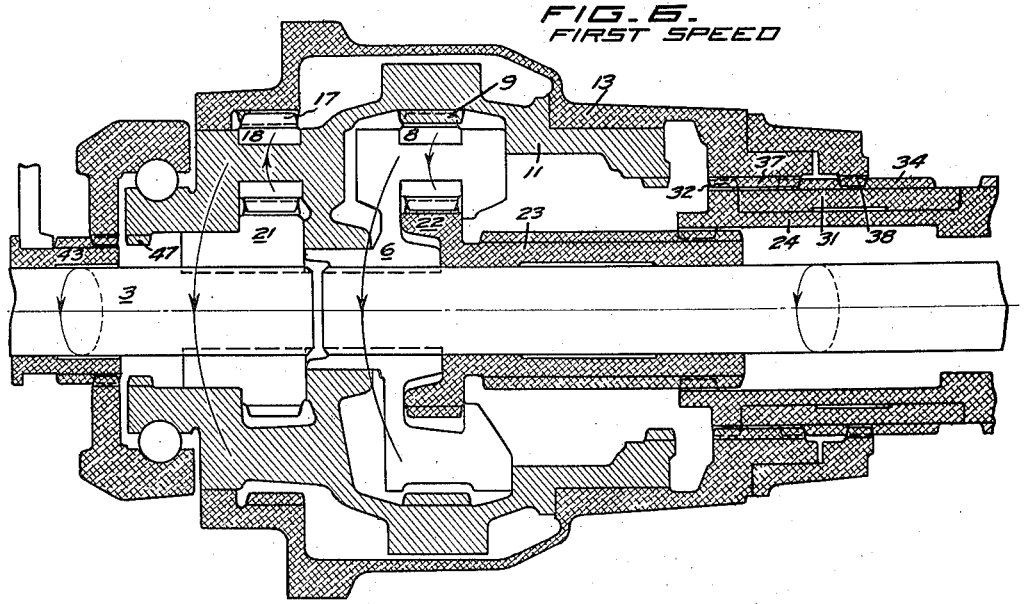
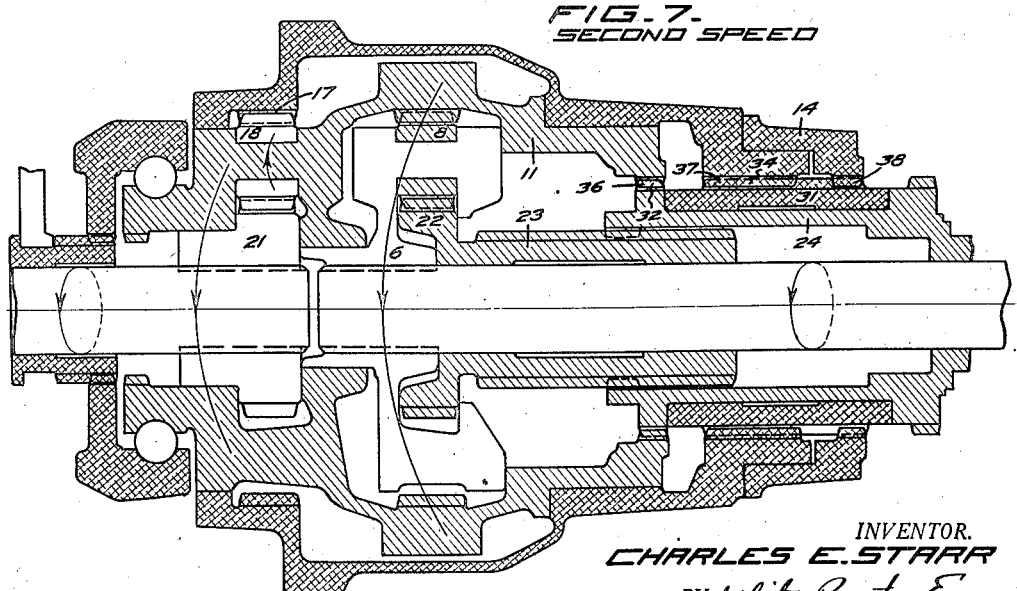
INVENTOR.
CHARLES E. STARR
BY *White Frost & Evans*
ATTORNEYS.

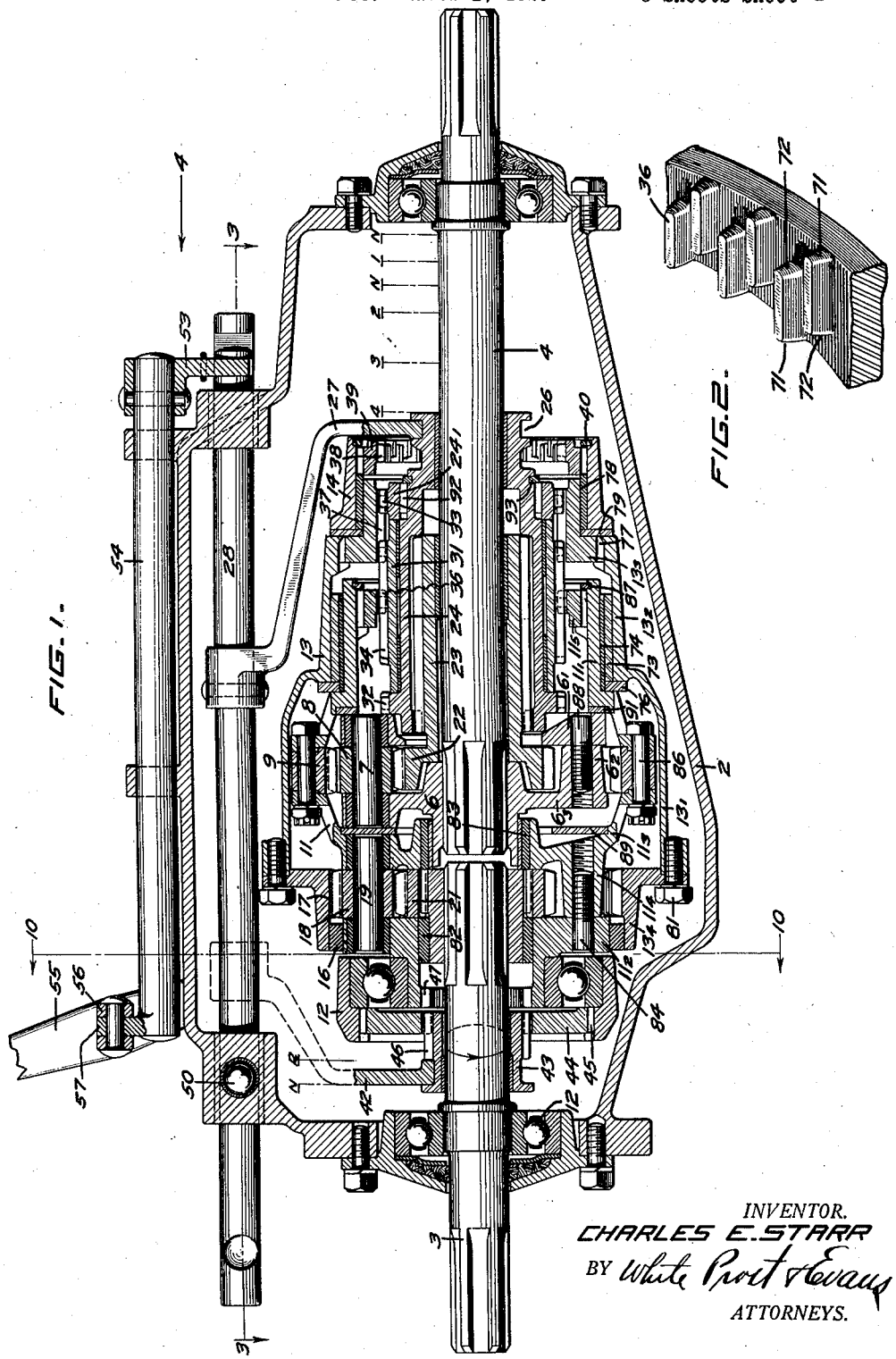

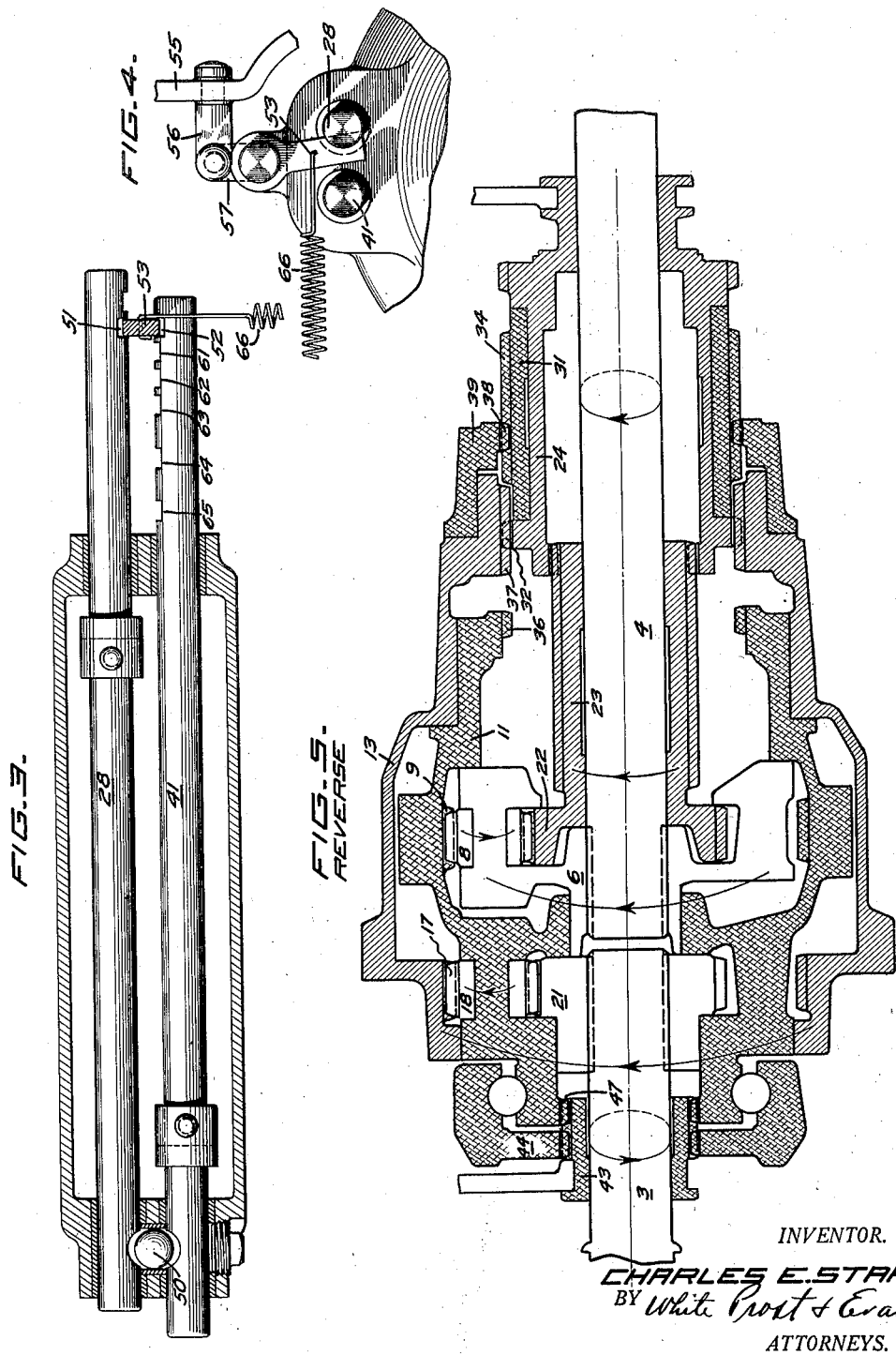

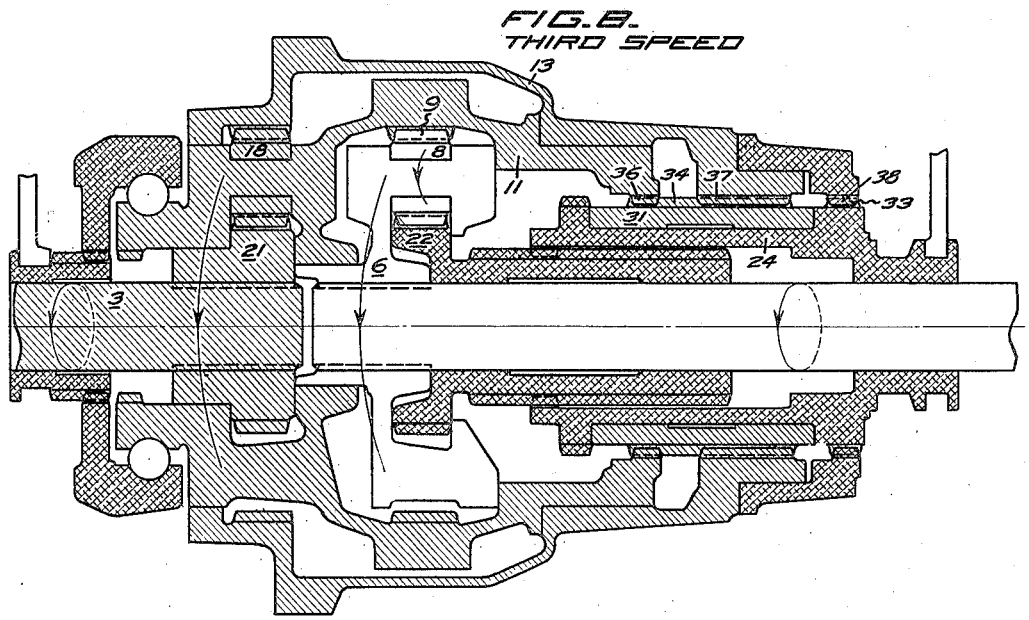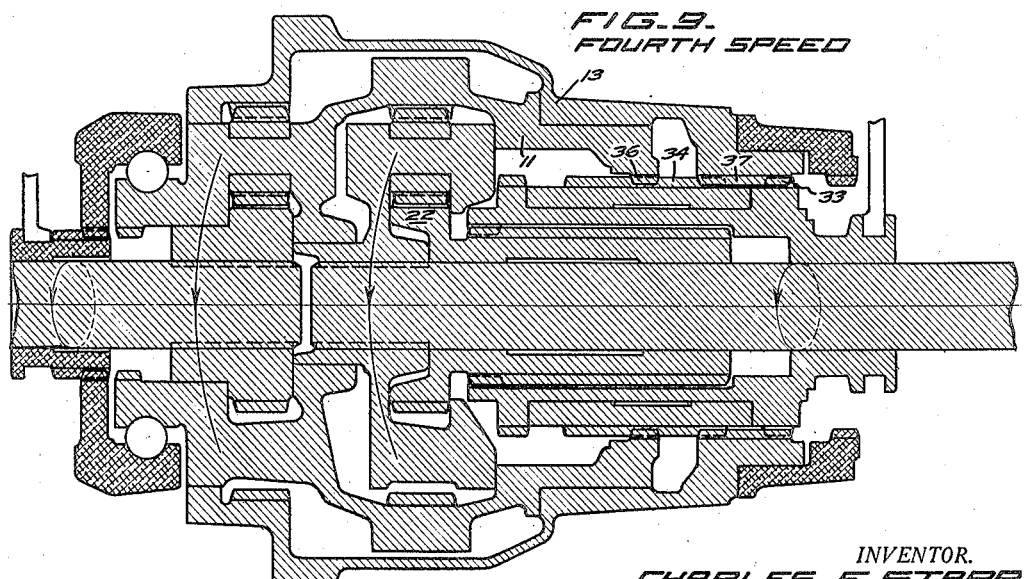

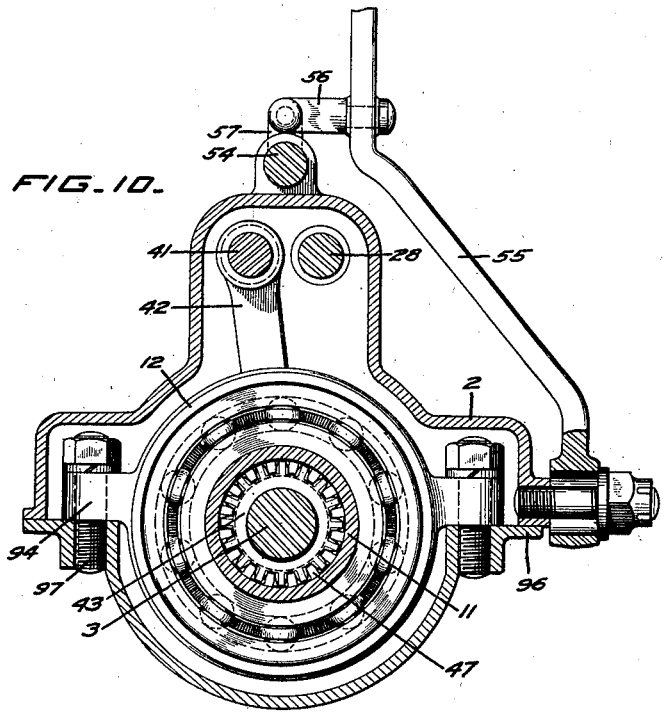

Patented Apr. 20, 1926.

1,581,695

UNITED STATES PATENT OFFICE.

CHARLES E. STARR, OF OAKLAND, CALIFORNIA, ASSIGNOR TO PERFECTO GEAR DIFFERENTIAL CO., OF OAKLAND, CALIFORNIA, A CORPORATION OF WASHINGTON.

TRANSMISSION GEARING.

Application filed March 1, 1923. Serial No. 622,019.

*To all whom it may concern:*

Be it known that I, CHARLES E. STARR, a citizen of the United States of America, and a resident of Oakland, county of Alameda, and State of California, have invented a new and useful Transmission Gearing, of which the following is a specification.

The invention relates to transmission gearing particularly adaptable for use in automobiles.

One of the objects of the invention is to provide a transmission in which four forward speeds and one reverse speed are available. Another object of the invention is to provide a transmission gearing which is substantially noiseless in operation. Another object of the invention is a transmission of the progressive type characterized by ease, speed, and certainty of the shifting from one speed to another. Another object of the invention is the provision of a planetary transmission gearing in which the gear ratios closely approximate those recognized as ideal by automotive engineers.

The invention possesses many other objects and features of advantage, some of which, with the foregoing, will be set forth in the following description of the invention. It is to be understood that I do not limit myself to the showing made by the said description as I may adopt variant forms of the invention within the scope of the claims.

Referring to the drawings: Fig. 1 is a vertical sectional view of the transmission. Fig. 2 is a perspective view of a portion of one of the toothed clutch elements showing the staggered teeth. Fig. 3 is a horizontal sectional view, the plane of section being indicated by the line 3—3 of Fig. 1. Fig. 4 is an elevation of the upper section of the transmission taken from the direction indicated by the arrow 4 in Fig. 1. Figs. 5, 6, 7, 8 and 9 are diagrammatic views patterned after Fig. 1, and showing the positions of the various parts when in reverse, first or low speed, second, third and fourth or high speeds respectively. In each of these views the parts which are locked together by the movement of the clutch elements are similarly shaded. Fig. 10 is a vertical sectional view taken in the plane indicated by the line 10—10 of Fig. 1.

Broadly considered from one angle, the invention comprises a pair of planetary gear systems arranged within a relatively fixed housing, the planet gears of one system being journaled on an axis fixed in respect of the ring gear of the other system. Clutch means are provided for locking together in varying combinations the fixed housing and the elements of the two planetary systems, so that, between the driving and driven shafts, four forward speeds and one reverse speed are obtainable.

In detail, the invention comprises a relatively fixed housing 2, suitably mounted in the frame of the automobile in which the transmission is installed. Journaled in one end of the housing is the driving shaft 3, adapted to be turned in the usual manner by the engine of the vehicle. Alined with the driving shaft and journaled in the opposite end of the housing 2 is the driven shaft 4 arranged to be connected in the usual way with the driving pinion in the differential. Fixed for rotation on the driven shaft 4 is a frame or rotor designated as a whole by the reference character 6, and in which are fixed, on an axis parallel to the axis of the driven shaft, pins 7 upon which planet gears 8 are journaled. Preferably there are three such pins and planet gears mounted on the rotor 6. In mesh with the planet gears 8 is a ring gear 9 carried by the rotor designated as a whole by the reference character 11, and which for convenience in manufacture and assembling, is made in a number of pieces, but which functionally comprises a rigid frame journaled at one end (left of Fig. 1) in the ring 12 supported in the housing, and at the other end journaled in the outer rotor designated as a whole by the reference character 13, and which in turn, is adjacently journaled in the ring 14, fixed in the housing. The opposite end of the rotor 13 is journaled upon the intermediate rotor 11, a bearing bushing 16 being interposed between the two. Like the intermediate rotor, the outer rotor is also made of a number of pieces for convenience in assembling and manufacture, and also like the intermediate rotor, is provided with a ring gear 17, in mesh with planet gears 18, preferably three in number, journaled on pins 19, which form a part of the assembled intermediate rotor structure. Splined on the end of the driving shaft 3, and in mesh with the planet gears 18, is the center gear 21, which, as shown in Fig. 1, is also made preferably in two pieces toothed together for convenience in assembly.

Loose on the driven shaft is the center or sun gear 22 in mesh with the planetary gears 8. The hub of this gear is extended along the driven shaft, forming the sleeve 23, upon which is slidably arranged for rotation with the sleeve and sun gear, the sleeve 24, journaled on the shaft 4 at one end, in which is arranged a groove 26, engaged by the yoke arm 27, which is fixed to one of the shifting rods 28. The sleeve 24 is formed with flanges at each end between which is journaled the collar 31. Both the sleeve 24 and the collar 31 are formed with teeth on their peripheral surfaces, a series of teeth 32 surrounding the inner end of the sleeve 24 and a series of teeth 33 surrounding the outer end. A series of long teeth 34 surround the collar 31, a space, however, being left at each end of the collar between the teeth 34 and the adjacent sleeve teeth 32 and 33. Each of the series of teeth constitute clutch elements, and complementary clutch elements or teeth are arranged on the outer and intermediate rotor and on the housing or fixed element. On the intermediate rotor a series of inwardly projecting teeth 36 are formed, and on the outer rotor appears the series of wide teeth 37, while teeth 38 are formed in the fixed ring 39 seated within the ring 14, and held therein by means of interlocking teeth and a retaining ring 40 sprung into a suitable groove. A second shift rod 41, carries a yoke arm 42 at the opposite end of the housing from the yoke arm 27. The yoke arm 42 is engaged with a sleeve 43, journaled upon the driving shaft 3 and in toothed sliding engagement with the ring 44, fixed within the ring 12, by means of the interlocking teeth 45. The sleeve 43 is therefore slidable axially but is not rotatable. The teeth 46, of the sleeve 43, constitute clutch members, and complementary teeth 47 are arranged on the intermediate rotor 11.

The various gear combinations possible to obtain with my transmission are dependent upon the shifting of the sleeve 43, and the sleeve 24 with its collar 31, so that different series of teeth may be engaged in such selective combinations as will give the desired relationship. These will be best understood by a reference to Figs. 5 to 9 inclusive, each of which represents the parts in one of the gear ratios. In these figures mere details of structure have not been indicated and in each figure the portions which are locked together are indicated by similar surface shading. Fig. 5 shows the parts in reverse gear the direction of motion of the various parts being indicated by the arrows.

It will be noted that the intermediate rotor 11 is held stationary, by the engagement of the non-rotatable sleeve 43 with the teeth 47 thereon. It will also be noted that the sleeve 24 has been shifted to its extreme position to the right, and that the teeth 32 are in engagement with the teeth 37, thus locking the center gear 22 and the outer rotor 13 together. The engagement of the teeth 34 with the teeth 38 of the fixed element 39, is without significance and merely causes the collar 31 to be held stationary. With the clutch members so disposed rotation of the center gear 21, by the driving shaft 3, turns the planet gears 18 about their fixed journals, and effects rotation of the ring gear 17 and outer rotor 13, together with the connected center gear 22 in a direction contrary to that of the shaft 3. This of course causes planetation of the gears 8 within the ring gear 9, and a consequent driving of the inner rotor 6 and the connected shaft 4 in the reverse direction.

To secure the parts in the relation to give the first or low speed, as shown in Fig. 6, the clutch sleeve 43 moves outwardly to disengage the teeth 47, leaving the intermediate rotor 11 free. The sleeve 24, carrying the collar 31 is moved inwardly so that the teeth 34 engage both the teeth 38 and teeth 37, thus holding the outer rotor 13 stationary. Since the teeth 32 of the sleeve 24 are still in engagement with the teeth 37 of the outer rotor, the sleeve 23 and integral center gear 22, will also be held in fixed position with the outer rotor. Rotation of the driving shaft 3 and center gear 21 will thus effect planetation of the gears 18 within the ring gear 17, thus rotating the ring gear 9 and effecting planetation of the gears 8 about the fixed center gear 22. This causes the inner rotor 6 to revolve in the same direction as the driving shaft 3, but at a much reduced rate of speed.

In Fig. 7 the parts are shown connected to give second speed, that is the speed next higher than low. In this case as in the case of first speed, as well as in the case of third and fourth speed, the sleeve 43 is inactive, and the various combinations effected by movement of the sleeve 24, which is always fixed for rotation with the sleeve 23 on the center gear 22. In the second speed combination, sleeve 24 has been moved still further inwardly, so that the teeth 32 now engage the teeth 36 of the intermediate rotor 11. This engagement fixes the intermediate rotor 11 and the sleeve 23 of the center gear 22 together, so that in effect the inner rotor 6, center gear 22, the planetary gear 8 and the intermediate rotor 11 are one rigid structure. This of course results from the locking of the intermediate rotor 11 and the sleeve 23 together, preventing rotation of the planetary gears 8 upon their axes. It will also be observed that the teeth 34 of the collar 31, engage both the teeth 38 on the fixed element 14, and the teeth 37 on the outer rotor, thus holding the outer rotor stationary. Rotation of the driving gear 21 thus effects planetation of the planet gears 18 with the stationary ring gear 17, rotating the intermediate rotor with the parts locked thereto in a forward direction at a speed dependent on the ratios of the gears involved.

In Fig. 8 which shows the parts arranged to give third speed, the sleeve 24 is moved still further inwardly so as to lock the teeth 33 with the teeth 38 of the fixed element thus locking the center gear 22 to the housing. At the same time the teeth 34 of the collar 31 engage both the teeth 36 of the intermediate rotor 11 and the teeth 37 of the outer rotor 13, thus locking the outer and intermediate rotors together and preventing rotation on their respective axes of the planetary gears 18. In effect therefore, the driving shaft 3, driving gear 21, planetary gears 18, intermediate rotor 11, and outer rotor 13 are locked in a rigid structure and revolve as a whole, the ring gear 9 on the intermediate rotor 11 effecting planetation of the gears 8 about the fixed center gear 22 so that the inner rotor 6 is driven in a forward direction and at a speed determined by the ratios of the operating gears.

In Fig. 9 the parts are shown in the relation in which the fourth or high speed combination of gears is obtained, all of the parts being locked to revolve as a single unitary structure. It will be observed that the outer rotor 13 is locked to the center gear 22 by the engagement of the teeth 33 with the teeth 37 and that the engagement of teeth 34, with both the teeth 37 and the teeth 36 of the intermediate rotor 11, locks the intermediate rotor into the same combination with the center gear and outer gear. Since relative rotation of the center gear 22, the intermediate rotor 11, and the outer rotor 13 is thus prevented, both sets of planetary gears are prevented from rotation on their journal axes and the parts are locked together so that a direct drive is secured between the driving and driven shafts.

Means are provided for moving the shifting rods 28 and 41 to effect the combinations just explained. As best shown in Fig. 3, the two shift rods 28 and 41 are parallel and spaced slightly apart. Each is provided with a notch which in association with the ball 50, prevents simultaneous movement of the rods while permitting either rod to be moved separately. On the face of the rod 28, adjacent the rod 41, is a notch 51 and a corresponding notch 52 is formed in the rod 41 opposite thereto. These notches are adapted to receive a selective finger 53, mounted on a slide 54 disposed on top of the housing 2. The slide 54 is controlled by a hand lever 55 slidably pivoted at its lower end on the housing 2, Fig. 10, and so connected to the slide that the latter may be moved either backwardly or forwardly in an axial direction, or oscillated about its axis to engage the selective finger 53 in either of the two notches 51 and 52. This connection of the slide to the lever, as shown in Figs. 1, 4 and 10, comprises a stud 56 fixed on the lever 55 and pivoted to a short lever arm 57 fixed on the slide. These notches are deep enough to permit the finger when fully engaged in either notch, wholly to clear the opposite or other rod. At intervals along the rod 41 are formed other notches 61, 62, 63, 64 and 65. The position of these notches is determined so that when the selective finger is engaged therein a corresponding gear relationship has been obtained by movement of the clutch sleeve 24. For example, to throw the gears into low or first speed, the lever 57 is moved first to seat fully the selective finger 53 in the notch 51, and then to draw back the rod 28 until the finger may be seated in the notch 61, in which it is resiliently held by the spring 66, interposed between it and any convenient portion of the housing 2. The depth of the notch 61 is not sufficient however to permit disengagement of the selective finger from the notch 51 and the selective finger is thus engaged with both rods 28 and 41 which, it will be remembered, cannot be moved simultaneously. The gears are thus securely held in engagement with no possibility of slipping. Movement of the lever 57 to disengage the selective finger 53 from the notch 61 and move the rod 28 still further until the finger may engage in the notch 62 places the gears in a neutral position. In a similar manner engagement of the selective finger 53 with notch 63, 64, or 65 effects a shifting of the sleeve 24 to effect second, third and fourth speeds respectively. With the rods 28 and 41 in the position shown in Fig. 3, so that the selective finger 53 may be seated fully in either of the notches 51 and 52, the gears are in neutral between first or low speed and reverse, the clutch sleeve 24 which is controlled by the rod 28 being in the position shown in Fig. 5, that is, so that the sleeve 23 on the center gear 22 and the outer rotor 13 are locked together.

If the selective finger 53 now be shifted into notch 52 so as to clear the rod 28, the rod 41 may be moved outwardly,(to the right of Fig. 3) to move the clutch sleeve 43 inwardly into the position shown in Fig. 5, thus locking the intermediate rotor 11 with the stationary housing. The connection is now that required for a reverse motion of the driven shaft.

It will have been observed that the engagement of one series of clutch teeth with another series is by movement in a direction parallel to the axis of rotation of the parts, that is, it is an end-to-end engagement of the teeth. In order to lessen any resistance offered by the engagement of the clutch teeth with their complementary members I have, as shown in Fig. 2, staggered the teeth in each series in a plane perpendicular to the direction of the movement of the series, that is to say, as to each series, each alternate tooth is so formed that its leading or engaging face 71 lies in a plane to one side of the plane of the faces 72 of the other teeth. When the teeth are so formed the number of possible contacts of teeth without positive interlocking is greatly reduced. The alternate teeth, in both of the engaging series, which project beyond the others first engage, and then both series slip readily into full engagement.

In operation, it is found that there is no perceptible resistance to the instant shifting of the clutch sleeves to engage different series of clutch teeth. The steps from one gear ratio to another are so gradual that the engaging parts pick up speed or lose it without shock.

The detailed structure of the rotors is that dictated by the requirements of economical manufacture and facility of assembly. As best shown in Fig. 1, the outer rotor comprises a cylindrical portion $13_1$ constructed at one end $13_2$ to receive the bushing 73 in which one end $11_1$ of the intermediate rotor fitted with the band 74 is journaled. A thrust ring 76 is also interposed between the two rotors at this point. The extreme end $13_3$ of the outer rotor, and on which the teeth 37 are formed is preferably made as a separate piece and seated in the flanged end of the portion $13_2$ where it is retained securely by the teeth 77. Between this portion and its bearing 14, the bushing 78 and thrust ring 79 are interposed.

At the opposite end of the portion $13_1$, the ring gear 17 is formed on the portion $13_4$ secured to the part $13_1$ by cap screws 81. The portion $13_4$ is extended sufficiently to the left, of Fig. 1, to carry the bearing bushing 16, in which the portion $11_2$ of the intermediate rotor is journaled.

Between the portion $11_2$ of the intermediate rotor and the hub of the driving gear 21, a bearing bushing 82 is interposed. Portion $11_3$ of the intermediate rotor is journaled upon the hub of the inner rotor 6, suitable bushings 83 being placed therebetween. The part $11_3$ is provided with lugs $11_4$ spaced between the pins 19, and in which the studs 84 are threaded. The ends of these studs seat in the part $11_2$, forming a rigid cage-like structure for the support of the intermediate gears 18. Between the flanged adjacent edges of parts $11_3$ and 11, the ring gear 9 is secured by bolts 86. The teeth 36 are formed on a separate ring $11_5$ secured in the flanged end of portion $11_1$ by interlocking teeth and the retaining ring 87.

A cage-like structure for the intermediate gears 8 like that already described for the gears 18 is provided by the inner rotor, a ring $6_1$ being connected by studs 88 with the lugs $6_2$ formed on the main portion $6_3$. This cage is separated on each side from the adjacent portion of the intermediate rotor by thrust rings 89 and 91.

That portion of the clutch sleeve 24 which bears the teeth 33 is also preferably formed as a separate piece $24_1$, connected to the main portion by the teeth 92 and the retaining ring 93.

The rings 12 and 14, and the method of mounting them in the housing 2, are important features in my transmission. Referring chiefly to Fig. 10, the ring 12 is provided with lugs 94 extending diametrically therefrom to rest on seats 96 in the lower half of the housing, to which the lugs are secured by screws 97. This structure comprises parts easily and cheaply machined and readily assembled in accurate alinement. The bearing 14 is similarly constructed.

Lubrication of the various moving parts of my device is of course an important item and this is amply provided for by placing a quantity of lubricant in the housing 2 from which it is distributed thru and over the parts during their movement, gaining access thereto thru spaces left between the parts or thru apertures suitably formed for the purpose.

The various bushings and thrust rings give long life, equalize wear, distribute the stresses and insure alinements, so that coupled with naturally quiet operation of the planetary type of gearing, a substantially noiseless transmission is secured.

I claim:

1. A transmission gearing comprising a pair of alined shafts, a center gear tight on one of said shafts, a center gear loose on the other shaft, a planet gear (I) journaled on an axis fixed in respect of said other shafts and in mesh with said loose center gear, a ring gear (I) in mesh with said planet gear (I), a planet gear (II) journaled on an axis fixed in respect of said ring gear (I) and in mesh with said tight center gear, a ring gear (II) in mesh with said planet gear (II), and means for optionally locking the parts as follows: (a) the loose center gear and both ring gears together, (b) the loose center gear against rotation, and the two ring gears together, (c) the loose center gear to said ring gear (I) and said ring gear (II) against rotation, (d) the loose center gear and said ring gear (II) against rotation, (e) the loose center gear to said ring gear (II) and ring gear (I) against rotation.

2. A transmission gearing comprising a pair of alined shafts, a center gear tight on one of said shafts, a center gear loose on the other shaft, a planet gear (I) journaled on an axis fixed in respect of said other shaft and in mesh with said loose center gear, a ring gear (I) in mesh with said planet gear (I), a planet gear (II) journaled on an axis fixed in respect of said ring gear (I) and in mesh with said tight center gear, a ring gear (II) in mesh with said planet gear (II), and means for optionally locking the loose center gear to either or both ring gears or against rotation.

3. A transmission gearing comprising a pair of alined shafts, a center gear tight on one of said shafts, a center gear loose on the other shaft, a planet gear (I) journaled on an axis fixed in respect of said other shaft and in mesh with said loose center gear, a ring gear (I) in mesh with said planet gear (I), a planet gear (II) journaled on an axis fixed in respect of said ring gear (I) and in mesh with said tight center gear, a ring gear (II) in mesh with said planet gear (II), and means for optionally locking the loose center gear to either or both of said ring gears.

4. A transmission gearing comprising a pair of planetary gear systems, the planet gear of one system being journaled on an axis fixed in respect of the ring gear of the other system, and means for locking either or both of said planet gears against axial rotation.

5. A transmission gearing comprising a pair of planetary gear systems, the planet gear of one system being journaled on an axis fixed in respect of the ring gear of the other system, and means for locking the ring gear of either system against rotation.

6. A transmission gearing comprising a pair of planetary gear systems, the planet gear of one system being journaled on an axis fixed in respect of the ring gear of the other system, and means for locking the center gear of one system against rotation and the ring gears of both systems together.

7. A transmission gearing comprising a pair of planetary gear systems, the planet gear of one system being journaled on an axis fixed in respect of the ring gear of the other system, and means for locking the center gear of one system to the ring gear of the same system and the ring gear of the other system against rotation.

8. A transmission gearing comprising a pair of planetary gear systems, the planet gear of one system being journaled on an axis fixed in respect of the ring gear of the other system, and means for locking the center gear of one system and the ring gear of the other system against rotation.

9. A transmission gearing comprising a pair of planetary gear systems, the planet gear of one system (I) being journaled on an axis fixed in respect of the ring gear of the other system (II), and means for locking the center gear of said system (II) to the ring gear of said system (I) and the ring gear of said system (II) against rotation.

10. A transmission gearing comprising a pair of alined shafts, a center gear tight on one of said shafts, a center gear loose on the other shaft, a planet gear (I) journaled on an axis fixed in respect of said other shaft and in mesh with said loose center gear, a ring gear (I) in mesh with said planet gear (I), a planet gear (II) journaled on an axis fixed in respect of said ring gear (I) and in mesh with said tight center gear, a ring gear (II) in mesh with said planet gear (II), a fixed element, clutch teeth on said fixed element and said loose center gear and on both ring gears, and clutch mechanism engageable with said clutch teeth in varying combinations.

11. A transmission gearing comprising a pair of alined shafts, a center gear tight on one of said shafts, a center gear loose on the other shaft, a planet gear (I) journaled on an axis fixed in respect of said other shaft and in mesh with said loose center gear, a ring gear (I) in mesh with said planet gear (I), a planet gear (II) journaled on an axis fixed in respect of said ring gear (I) and in mesh with said tight center gear, a ring gear (II) in mesh with said planet gear (II), a fixed element, clutch teeth on said fixed element and on both ring gears, and clutch mechanism fixed for rotation with said loose center gear and engageable with said clutch teeth in varying combinations.

12. A transmission gearing comprising a pair of alined shafts, a center gear tight on one of said shafts, a center gear loose on the other shaft, an inner rotor fixed on said other shaft, a planet gear (I) journaled on said inner rotor and in mesh with said loose center gear, an intermediate rotor, a ring gear arranged on said intermediate rotor and in mesh with said planet gear (I), a planet gear (II) journaled on said intermediate rotor and in mesh with said tight center gear, an outer rotor, a ring gear arranged on said outer rotor and in mesh with said planet gear (II), a fixed element, and means for locking together in varying combinations said fixed element and center gears and rotors.

13. A transmission gearing comprising driving and driven shafts, a pair of planetary gear systems, the planet gear of one system being journaled on an axis fixed in respect of the ring gear of the other system, a series of clutch teeth fixed for rotation with the ring gear of each system, and clutch mechanism slidably mounted for rotation with the center gear of one of the systems and adapted to engage said clutch teeth in varying combinations.

14. A transmission gearing comprising driving and driven shafts, a pair of planetary gear systems, the planet gear of one system being journaled on an axis fixed in respect of the ring gear of the other system, a series of clutch teeth fixed for rotation with the ring gear of each system, a series of fixed clutch teeth, all of said clutch teeth lying in a cylindrical surface concentric with the center gear of one of the systems, and a cylindrical clutch mechanism slidably mounted for rotation with said center gear and adapted to interlock said center gear with said series of clutch teeth in varying combinations.

15. A transmission gearing comprising driving and driven shafts, a pair of planetary gear systems, the planet gear of one system being journaled on an axis fixed in respect of the ring gear of the other system, a series of clutch teeth fixed for rotation with the ring gear of each system, a series of fixed clutch teeth, all of said clutch teeth lying in a cylindrical surface concentric with the center gear of one of the systems, a toothed sleeve slidably mounted for rotation with said center gear, a toothed collar rotatably mounted on said sleeve, and means for moving said sleeve to interlock the teeth on the sleeve and collar with said series of teeth in varying combinations.

16. A transmission gearing comprising a pair of alined shafts, a center gear tight on one of said shafts, a center gear loose on the other shaft, an inner rotor fixed on said other shaft, a planet gear (I) journaled on said inner rotor and in mesh with said loose center gear, an intermediate rotor, a ring gear arranged on said intermediate rotor and in mesh with said planet gear (I), a planet gear (II) journaled on said intermediate rotor and in mesh with said tight center gear, an outer rotor, a ring gear arranged on said outer rotor and in mesh with said planet gear (II), said intermediate rotor enclosing said inner rotor and said loose center gear and said outer rotor enclosing said intermediate rotor, a fixed element, and means including toothed clutch elements for locking together in varying combinations said fixed element and center gears and rotors.

17. A transmission gearing comprising a pair of alined shafts, a center gear tight on one of said shafts, a center gear loose on the other shaft, an inner rotor fixed on said other shaft, a planet gear (I) journaled on said inner rotor and in mesh with said loose center gear, an intermediate rotor, a ring gear arranged on said intermediate rotor and in mesh with said planet gear (I), a planet gear (II) journaled on said intermediate rotor and in mesh with said tight center gear, an outer rotor, a ring gear arranged on said outer rotor and in mesh with said planet gear (II), a fixed element, means at one end of said intermediate rotor for locking it to said fixed element, and means at the other end for locking said fixed element, said rotors and said loose center gear together in varying combinations.

18. A transmission gearing comprising a pair of alined shafts, a center gear tight on one of said shafts, a center gear loose on the other shaft, an inner rotor fixed on said other shaft, a planet gear (I) journaled on said inner rotor and in mesh with said loose center gear, an intermediate rotor, a ring gear arranged on said intermediate rotor and in mesh with said planet gear (I), a planet gear (II) journaled on said intermediate rotor and in mesh with said tight center gear, an outer rotor, a ring gear arranged on said outer rotor and in mesh with said planet gear (II), a fixed element, said intermediate rotor being journaled at one end in said fixed element and at the other end in said outer rotor and said outer rotor being journaled at one end in said fixed element and at the other end on said intermediate rotor, and means for locking said fixed element, said rotors and said loose center gear together in varying combinations.

In testimony whereof I have hereunto set my hand.

CHARLES E. STARR.